April 6, 1943.   H. S. JANDUS   2,315,963
AUTOMOBILE WHEEL LOCK
Filed Feb. 23, 1942   2 Sheets-Sheet 1
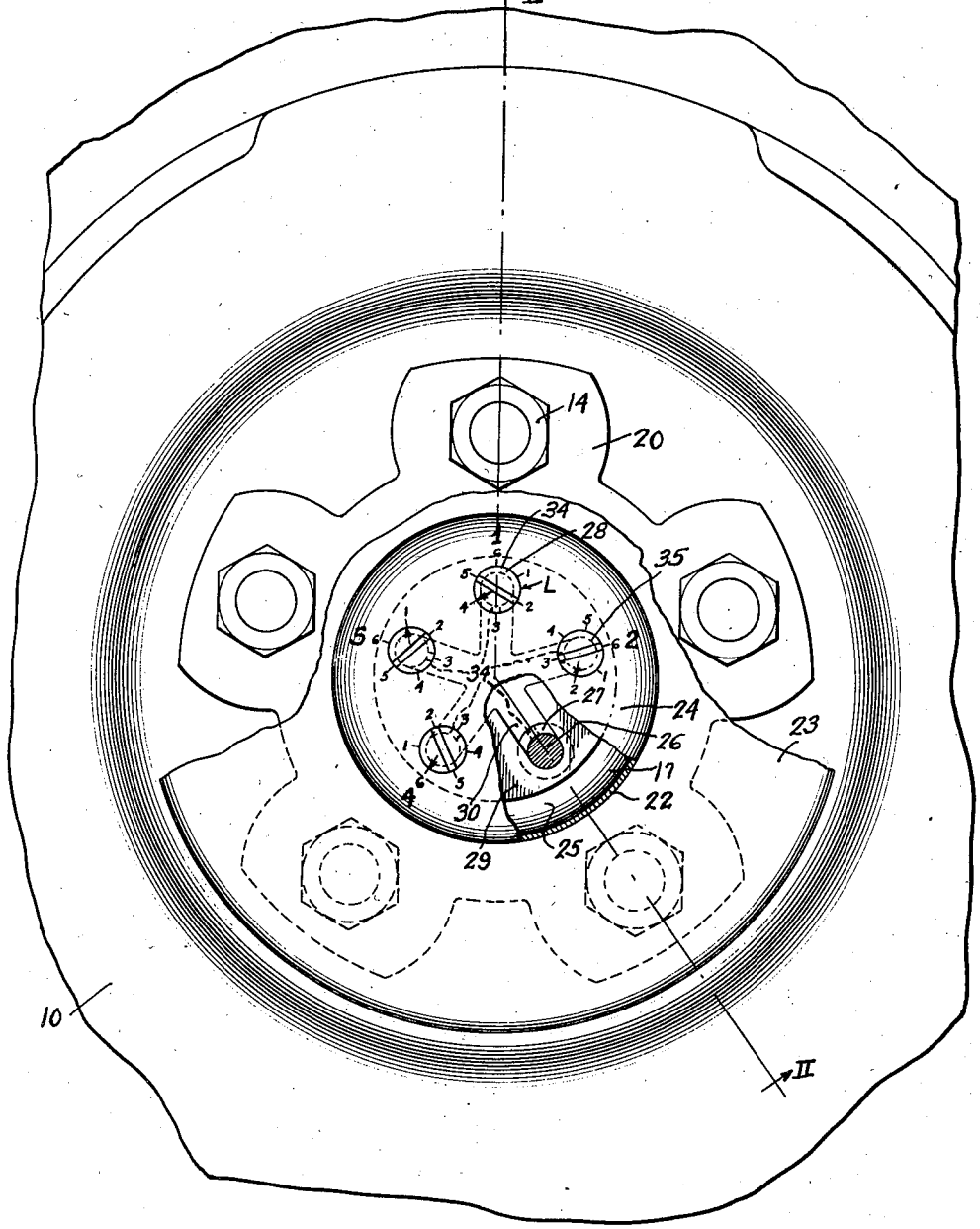
Inventor
HERBERT S. JANDUS.
by April 6, 1943.  H. S. JANDUS  2,315,963
AUTOMOBILE WHEEL LOCK
Filed Feb. 23, 1942  2 Sheets-Sheet 2
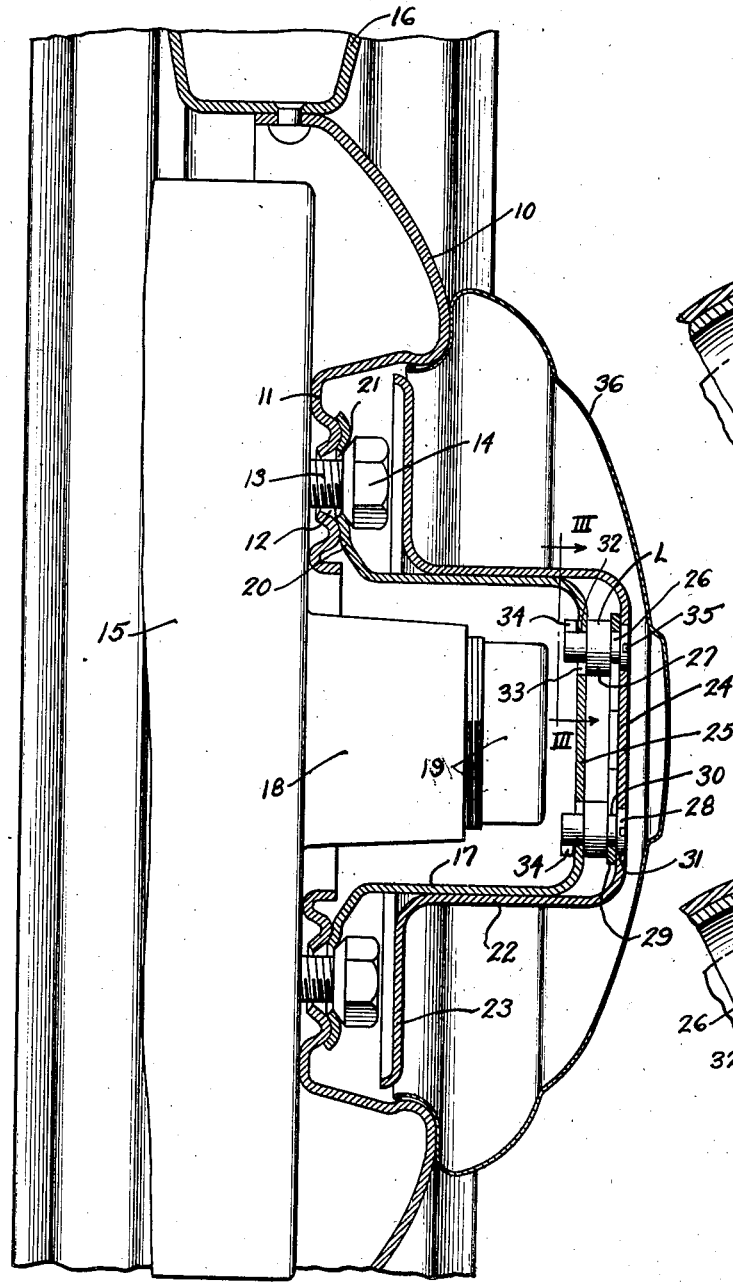
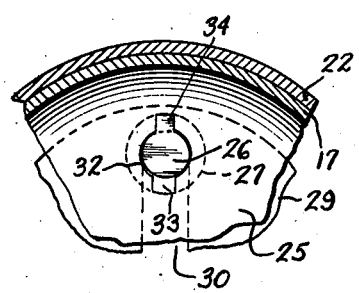
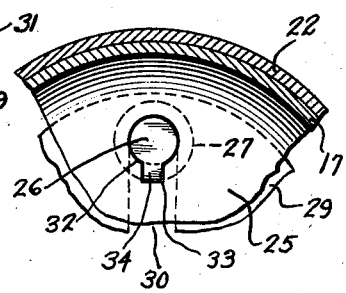
Inventor
HERBERT S. JANDUS.

Patented Apr. 6, 1943

2,315,963

UNITED STATES PATENT OFFICE 2,315,963

AUTOMOBILE WHEEL LOCK

Herbert S. Jandus, Detroit, Mich., assignor to Houdaille-Hershey Corporation, Detroit, Mich., a corporation of Michigan Application February 23, 1942, Serial No. 432,005

2 Claims. (Cl. 70—167)

My invention relates to locking assembly for frustrating the unlawful removal of a wheel from its hub structure or removal of the wheel together with its hub structure from a vehicle.

An important object of the invention is to provide simple locking structure in the form of sheet metal members to be locked in position concentric with the wheel for frustrating access to the bolts or nuts which secure the wheel to its hub structure and for frustrating access to the hub cap and to the nut which holds the hub structure to the axle.

A further object is to provide an assembly of lock members which must be selectively set to predetermine relative positions before the locking assembly can be dismantled for access to the wheel securing and holding bolts or nuts.

A further important object is to provide a number of rotatable lock members each of which must be rotated to a predetermined setting, known only to the owner of the car, in order that the entire lock assembly may be released.

The various features of my invention are all incorporated in the structure shown on the drawings, in which:

Figure 1 is an elevation view of the central portion of a wheel showing my improved locking assembly applied thereto;

Figure 2 is a section on plane II—II of Figure 1;

Figure 3 is an enlarged section on plane III—III of Figure 2 showing one of the lock members in locking position; and Figure 4 is a view similar to Figure 3 showing the lock member in unlocking position.

The wheel structure shown is of a well known type comprising the wheel disk 10 whose annular middle portion 11 is deflected inwardly and provided with holes 12 for receiving threaded studs 13. These studs may be the shanks of bolts having the heads 14 and engageable in threaded openings in the drum 15, or the studs may be permanently secured to the brake drum, in which case the heads 14 would be in the form of nuts engaging the outer ends of the studs, the heads or studs serving to secure the wheel disk to the brake drum. The wheel disk supports a rim 16 for mounting a tire (not shown) in a well known manner.

The wheel locking assembly comprises a cylindrical cup or cover 17 for receiving the outer end of the wheel bearing supporting hub 18 and the hub cap 19, the cup having radially extending ears 20 integral therewith provided with holes 21 for receiving the studs 13, so that the bolt heads or nuts 14 may secure the cap 17 in place when the wheel is secured to the brake drum.

The outer or locking cover 22 is in the form of a cylindrical cup for fitting over and receiving the inner cover 17, and has the annular flange 23 extending from its open end for position in front of the wheel supporting bolt heads or nuts to prevent access thereto.

The head wall 24 of the locking element 22 supports a number of lock members or bolts L for which the head wall 25 of the inner element 17 forms a keeper. Each lock bolt member is in the form of a cylindrical pin 26 having the enlarged cylindrical center portion 27, the outer end of the pin terminating in a head 28. A plate 29 has a number of slots 30 extending radially from the central portion of the plate to within a short distance of the periphery thereof, and these slots receive the lock bolts between their middle portions 27 and their heads, the bolts being shifted to the outer ends of the slots and then the plate is applied against the inner side of the head wall 24 with the heads 28 of the bolts extending into cylindrical openings 31 in the wall 24, the plate 29 being then secured to the wall 24 as by welding, and the lock bolts are thus held in position. Any number of such lock bolts may be provided equally spaced in a circumferential row, five bolts being shown.

In the outer wall 25 of the inner cover structure 17 are the circular holes 32 spaced to axially register with the bolt pins 26 for passage of the inner ends of the pins therethrough when the outer cover or locking element 22 is applied. Each hole 32 has a slot 33 extending radially therefrom in the wall 25 and on the inner end of each bolt pin 26 is a radial extension 34 for registering with the corresponding slot. When the locking extensions or tongues 34 on the bolts are in alignment with the respective slots 32, upon application of the locking cover 22, the pins can pass through the holes and slots, and then upon turning of the bolts the locking cover 22 will be locked to the inner cover 17, the enlarged portions 27 of the bolts then engaging against the front side of the wall 25 of the inner cover member 17 and the locking tongues 34 engaging behind the wall 25, so that the outer cover will be securely locked in place with its flange 23 in front of the wheel securing bolts or nuts to frustrate access thereto.

The lock bolts L are adapted to be turned by any suitable tool. As shown, the bolt heads have diametrally extending slots 35 in their outer ends for application of a tool such as a screwdriver, and the position of the slot on each bolt is different in relation to the direction of the bolt locking tongue 34, the bolt releasing slots 33 extending preferably radially inwardly. Around each of the holes 31 into which the bolt heads extend, radial indicating lines are marked on the outer face of the wall 24 and designated by numbers. As shown, there are six such lines axially spaced apart, to which the reference numerals 1 to 6 respectively are applied. On each bolt head is marked an arrow for cooperating with the indications 1 to 6, and numerals 1, 2, 3, 4, and 5 may be applied on the wall 24 adjacent to the bolt heads to designate the bolts as Nos. 1 to 5 respectively. On Figure 1, the locking tongues 34 on all of the bolts are shown as extending radially inwardly in alignment with the respective slots 33 in the wall 25, so that all the bolts are in unlocking position. With this position, the arrow on bolt No. 1 is in registration with the 4 indication, the arrow on bolt No. 2 is in registration with the 2 indication, and at the bolts Nos. 4 and 5 the arrows respectively register with the indications 6 and 1, while at the No. 3 bolt the arrow (not shown) may register with the 3 indication. The combination for unlocking the locking cover is thus determined, and the bolts must be set with the arrows in accordance with this combination for unlocking of the locking cover, so that it may be withdrawn for access to the wheel securing bolts or nuts, after which the inner cover 17 may be removed. To relock the locking cover, it is applied with the arrows in their defined unlocking positions, and then the various bolts are turned in either direction for displacement of the respective locking tongues 34 from the slots 33. Then, without knowing the unlocking combination, it will be impossible for a thief to set the bolts all in unlocking position for removal of the locking cover. However, to one knowing the combination, the lock bolts can be quickly set for unlocking of the locking cover. Unlawful removal of the wheel from its hub structure, or removal of the wheel with its hub structure is thus frustrated and theft prevented.

The guard or locking flange 23 of the locking cover is close to the bolt heads or nuts and well within the outer edge of the recess in the wheel disk 10, so that it will be difficult to insert tools between the flange and the wheel disk. A wheel cap 36 may be applied to and frictionally held on the wheel disk to protect the locking assembly against dust, dirt, and the weather.

I have shown a practical and efficient embodiment of my invention, but I do not desire to be limited to the exact construction and arrangement shown and described, as changes and modifications may be made without departing from the scope of the invention.

I claim as follows:

1. A locking assembly on an automobile wheel of the type shown, comprising a keeper element in the form of a cylindrical cup having a laterally extending flange apertured to receive the wheel supporting bolts to be thereby secured to the wheel, a locking cover in the form of a cylindrical cup for receiving the keeper member and having a laterally extending flange for location in front of the wheel supporting bolts to prevent access thereto, the outer wall of said locking cover having a plurality of circular holes therethrough and the outer wall of said keeper element having locking holes in alignment with said circular holes, a plurality of integral lock bolts each having a cylindrical head for engagement with one of said circular openings and having an intermediate enlarged body part, a plate secured to the inner side of the outer wall of said locking cover and having slots receiving said bolts between their heads and enlarged portions whereby to hold said bolts with their heads in said circular openings, said bolts having locking tongues on their inner ends and the openings through the front wall of said keeper element having slots extending therefrom for receiving said tongues when said locking cover is applied to the keeper element, said bolts being individually rotatable to move their tongues out of the respective locking slots for locking engagement of the tongues with the keeper element after application of the locking cover thereto whereby said bolts must all be individually rotated to predetermined positions before their locking tongues are brought into alignment with said locking slots for removal of the locking cover from the keeper element.

2. A locking assembly on an automobile wheel of the type shown, comprising a keeper member in the form of a cup surrounding the outer end of the wheel supporting hub and the hub cap thereon and having a flange portion apertured to receive the wheel supporting bolts to be thereby secured to the wheel, a locking cover in the form of a cup for receiving the keeper member and having a flange to be positioned in front of the wheel supporting bolts to prevent access thereto, the front wall of said locking cover having a plurality of circular openings therethrough, lock bolts having cylindrical heads extending into said openings, a common securing member on the inside of said locking cover engaging said bolts to hold their heads in said circular openings for rotation of the bolts from the exterior of the locking cover, the front wall of said keeper member having openings therein and locking slots extending therefrom, said bolts at their inner ends having locking tongues for passing through said locking slots when said locking cover is applied to said keeper member whereafter individual turning of said bolts different distances to carry their tongues out of said locking slots and behind the front wall of the keeper member will lock said locking cover to the keeper member and whereby said bolts must be individually turned from the exterior of the locking cover to realign their tongues with said locking slots before the locking cover can be removed, and indicating means on the locking cover adjacent to the bolt heads for enabling the person knowing the locking combination to turn said bolts for unlocking of the locking cover.

HERBERT S. JANDUS.